April 7, 1942.   P. WHITE ET AL   2,278,958
PISTON
Filed March 4, 1941   3 Sheets-Sheet 2

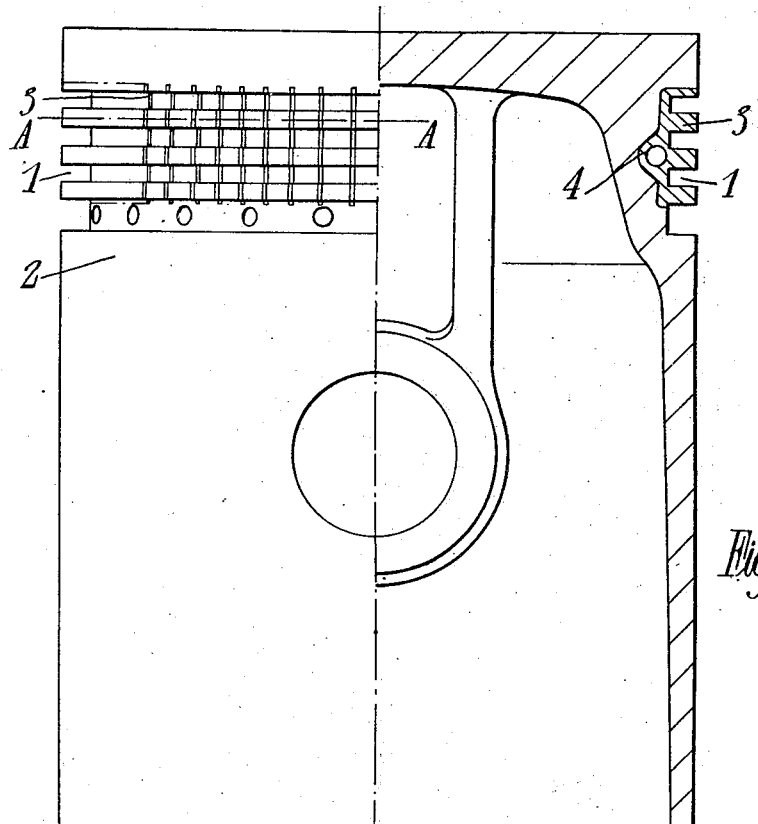

Inventors,
P. White, E. Dennis &
A. V. Nicolle
By: Glascock Downing & Seebold

Patented Apr. 7, 1942

2,278,958

UNITED STATES PATENT OFFICE 2,278,958

PISTON

Percy White, Eric Dennis, and Arthur Villeneuve Nicolle, Twickenham, England, assignors to The Automotive Engineering Company Limited, Twickenham, England Application March 4, 1941, Serial No. 381,734
In Great Britain July 12, 1940

7 Claims. (Cl. 309—14)

This invention relates to light metal or alloy pistons.

In order to reduce wear of the piston ring grooves of such pistons, it has been customary to provide these grooves in an iron or steel ring cast or sunk into the piston body and to rely upon the particular relation of the coefficients of expansion of the two metals for preventing the insert ring from working loose in the piston.

In practice, however, it has been found that these insert rings tend to work loose after use of the pistons and this is probably due to the fact that whereas the metals of the insert and the piston bear the required relationship at one temperature, such relationship does not remain the same for all temperatures, so that in the course of raising the piston from atmospheric temperature to working temperature relative movement takes place between the insert and the piston.

The invention has for its object to provide a satisfactory bearing surface for the piston rings of a light metal or alloy piston.

The invention accordingly consists in a light metal or alloy piston wherein the bearing surface of a piston ring therefor is provided by a plurality of inserts separated circumferentially by the metal of the piston, and made up of a material harder than that of the piston body and capable of affording a satisfactory wear resisting surface for the piston rings.

Such inserts may be in the form of flat strips or stampings, of which a multiplicity are employed and spaced apart in a ring around the piston body, or the inserts may be of segmental form and disposed in circumferentially spaced relationship around the piston body, in which latter case a fewer number, for example three to five inserts are necessary.

Figure 4:
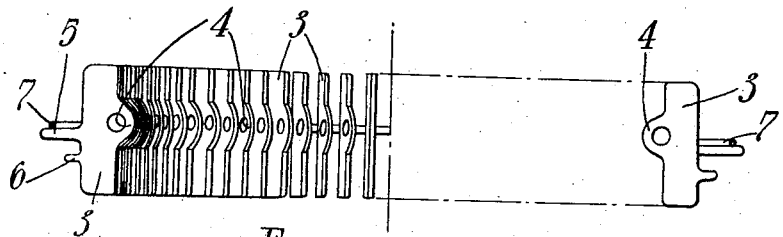
Figure 3:
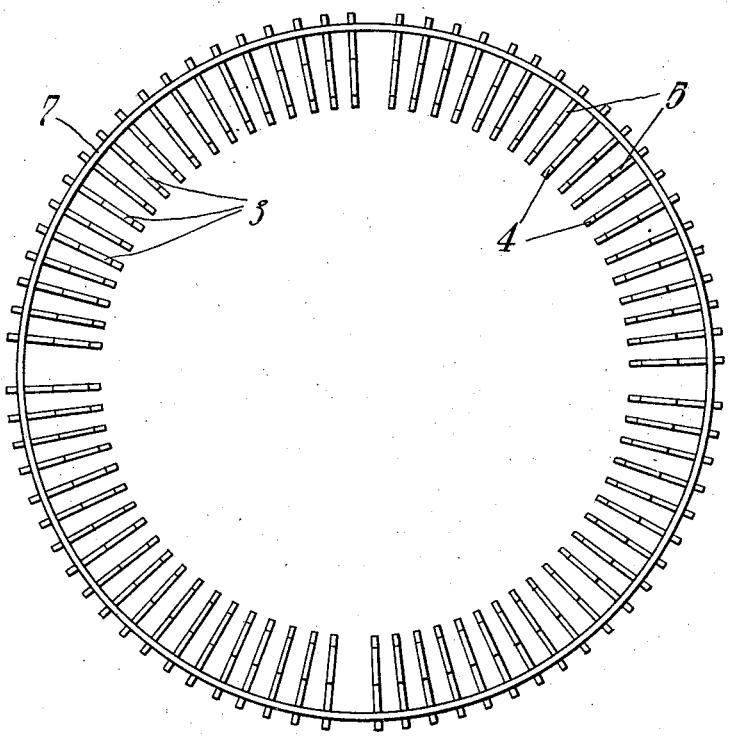
Figure 5:
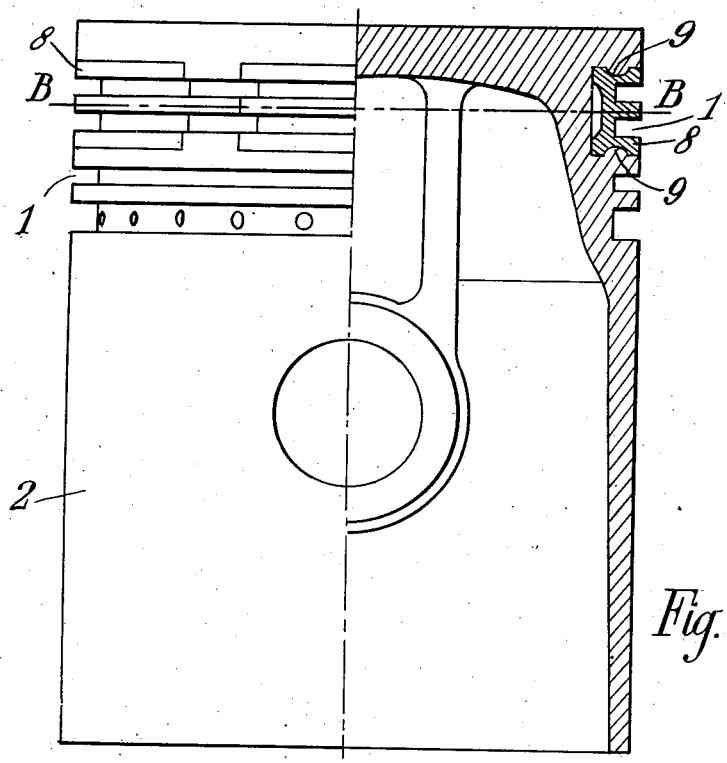
Figure 6:
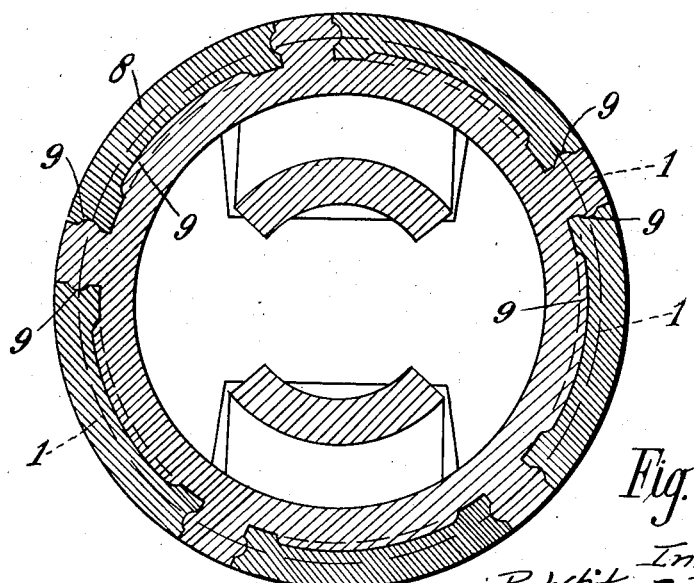

In the accompanying drawings:

Figure 1 is a longitudinal view of a piston incorporating the invention, being half in section and half in elevation, Figure 2 is a cross section on the line A—A of Figure 1, Figure 3 is a plan view of a batch of insert members assembled together on a ring ready for placing in the casting mould, Figure 4 is a side view of Figure 3, Figure 5 is a similar view of Figure 1 but of a modified form of the invention employing segmental inserts, and Figure 6 is a sectional plan view of the line B—B of Figure 5.

In carrying the invention into effect as illustrated in the drawings, a piston is provided having the piston ring grooves 1 formed in part in the light metal or alloy constituting the piston body 2, and in part by the harder metal of a plurality of elements 3, embedded within the metal or alloy of the piston body, and extending circumferentially thereof at spaced intervals.

The said elements conveniently consist of similar strips, of iron or steel for example, which may be in the form of small stampings, and as an instance of the dimensions proposed it may be mentioned that for a 5" diameter piston each stamping would be approximately 1" long x ¼" wide x $\frac{1}{32}$" thick, disposed around the piston body at intervals of about ¼". The insert elements may be assembled two or more together to give a greater total thickness, or such greater thickness may be obtained by employing the insert elements in the form of small castings instead of stampings.

It is proposed that the said elements or stampings 3 should be embedded in the metal or alloy of the piston body during the casting of the latter, so that the metal or alloy runs into and fills the spaces between the adjacent elements, which become closely interlocked with the piston body, and to provide for an even greater interlocking the elements may be formed with transverse openings into which the metal or alloy of the piston body flows, or with interlocking projections or lugs 4 which extend into the metal or alloy of the piston which fills the gaps between the adjacent elements.

Figures 4 and 5 illustrate one mode of assembling the insert elements 3 according to which the latter, on their outer edges, are provided with two longitudinally spaced lugs consisting of a wider lug 5 and a narrower lug 6 which latter locates the assembly in the mould or chill and prevents relative radial displacement, while the lug 5 is secured by welding to one or preferably two wire rings 7 (only one being shown) and rests in a groove turned in the chill, thus preventing axial displacement of the assembly.

Instead of employing the inserts in the form of flat strips or stampings the same may be of segmental form and disposed at circumferentially spaced intervals around the piston body, in which case a fewer number of the inserts, for example three to five, are required. Thus referring to Figures 5 and 6, the inserts are in the form of segments 8 which are embedded in the metal or alloy of the piston body during the casting of the latter, and have recesses 9 into which the metal flows to provide the desired interlocking effect. In this example, the inserts are provided only for the two upper piston ring grooves, there being a lower groove into which the inserts do not extend, and which is formed entirely in the metal of the piston body 2.

When casting the piston body around the inserts the aluminium or other metal or alloy of the piston enters the spaces 9 between the adjacent inserts and fills them so that upon the aluminium solidifying the radial projections thus formed will tend to exert a gripping action on the end surfaces of the adjacent inserts, whereby an interlocking effect is obtained, which is not possible in the case of a single insert ring. Such interlocking is increased by providing the inserts with interlocking recesses into which the metal of the radial projections may enter.

We claim:

1. A light metal or alloy piston wherein the bearing surface of a piston ring therefor is provided by a plurality of inserts separated circumferentially by the metal of the piston and made up of a material harder than that of the piston body and capable of affording a satisfactory wear resisting surface for the piston ring.

2. A light metal or alloy piston according to claim 1, wherein the inserts are in the form of strips disposed edgewise and radially around the piston periphery.

3. A light metal or alloy piston according to claim 1, wherein the inserts are of segmental form.

4. A light metal or alloy piston according to claim 1, wherein the inserts are interlocked with the metal of the piston.

5. A light metal or alloy piston according to claim 1, wherein the inserts are in the form of thin and generally rectangular strips disposed edgewise and radially around the piston periphery at closely spaced intervals.

6. A light metal or alloy piston wherein the bearing surface of a piston ring therefor is provided by a plurality of inserts in the form of strips separated circumferentially by the metal of the piston, and interlocked with the metal of the latter, and made up of a material harder than that of the piston body and capable of affording a satisfactory wear resisting surface for the piston ring.

7. A light metal or alloy piston comprising a plurality of segmental inserts separated circumferentially by the metal of the piston body so that portions of the latter intervene between the adjacent segments, and having the piston ring grooves formed in part in the said inserts and in part in the said intervening body portions, being interlocked with the metal of the piston, and the said inserts being made up of a material harder than that of the piston body and capable of affording a satisfactory wear resisting surface for the piston ring.

PERCY WHITE.
ERIC DENNIS.
ARTHUR VILLENEUVE NICOLLE.